March 11, 1924.
H. H. HINDSHAW
PROCESS OF TREATING PEAT
Filed March 2, 1922
1,486,141
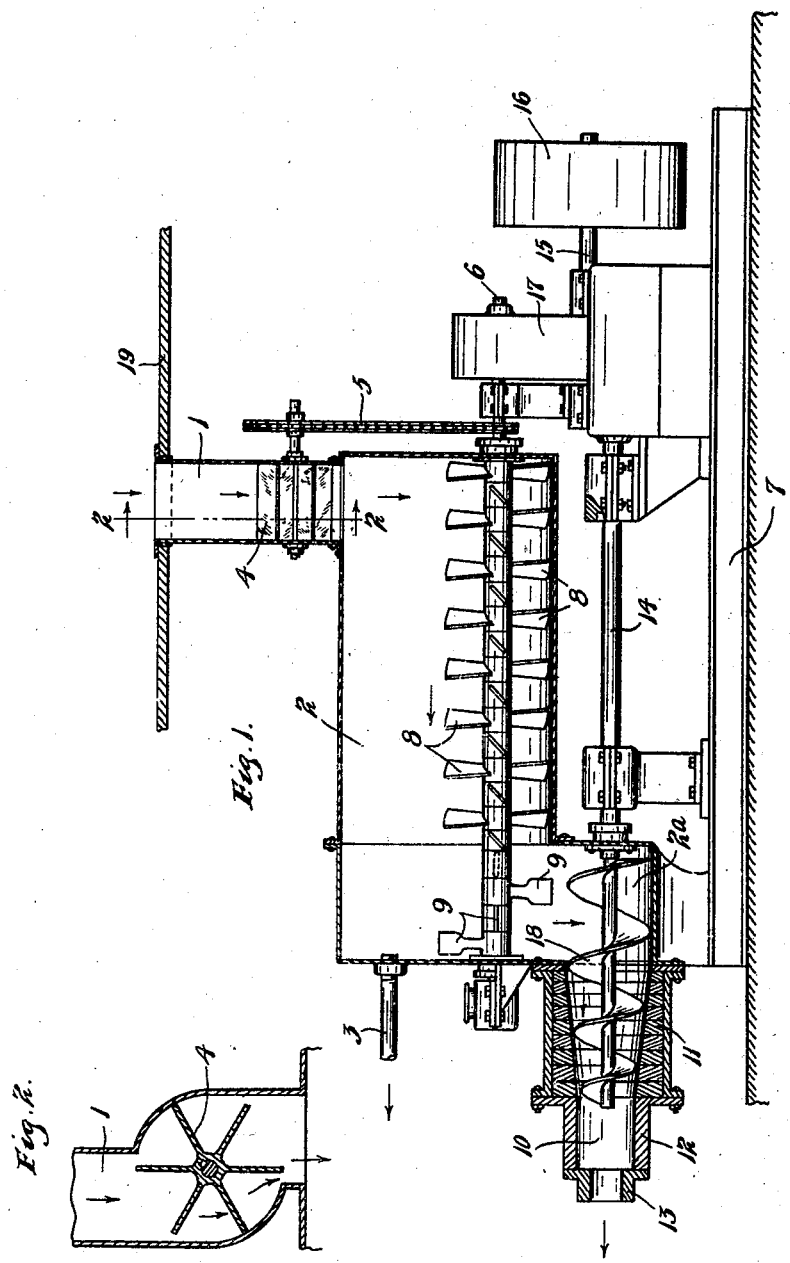
INVENTOR.
HENRY H. HINDSHAW.
BY HIS ATTORNEY.

Patented Mar. 11, 1924.

1,486,141

UNITED STATES PATENT OFFICE.

HENRY H. HINDSHAW, OF ST. PAUL, MINNESOTA, ASSIGNOR TO HINDSHAW ENGINEERING AND DEVELOPMENT COMPANY, OF ST. PAUL, MINNESOTA, A CORPORATION OF MINNESOTA.

PROCESS OF TREATING PEAT.

Application filed March 2, 1922. Serial No. 540,440.

*To all whom it may concern:*

Be it known, that I, HENRY H. HINDSHAW, a citizen of the United States, residing at St. Paul, in the county of Ramsey and State of Minnesota, have invented certain new and useful Improvements in Processes of Treating Peat; and I do hereby declare the following to be a full, clear, and exact description of the invention, such as will enable others skilled in the art to which it appertains to make and use the same.

This invention relates to a method for treating materials containing water or moisture and air or gases, and to the process of facilitating the drying of such materials and of obtaining a dehydrated product therefrom.

The invention is particularly designed for treating peat. As is well known, peat, in its natural raw condition, contains a great deal of moisture and is of rather loose and sticky consistency. To dry peat by the ordinary application of heat or by sun drying takes a very long time, and such drying is impracticable as a step in producing a desirable fuel from peat. Peat contains a jelly-like substance mixed with vegetable fibers and contains a great number of very small cavities or cells which are filled, or partly filled with water. This water will evaporate about the surface of the peat, but in ordinary drying, will not evaporate from the interior thereof, so that peat, if sun dried or heat dried, even when apparently dry, contains twenty to twenty-five per cent of water. This causes the peat when used for fuel to burn very slowly and to emit a very large amount of pungent fumes or smoke, rendering the same undesirable and unacceptable as a fuel.

It is an object of this invention to so treat the peat that the small cavities therein are broken up and the air released therefrom and the moisture or water therein given a chance to escape or be pressed out.

It is a further object of the invention to accomplish this result by agitating the peat by beating and mixing in a closed chamber in the presence of a partial vacuum and then to compress the peat into a compact mass, in which form it is discharged. The peat when so compressed, does not contain the cavities characteristic of the raw peat but any interstices which remain are exceedingly small. Such a compressed product dries quickly owing to the fact that capillary action resulting from the close texture draws the water remaining in the peat to the surface where it evaporates. It may be here stated that peat contains a starch-like substance known as pectin. On drying this substance at the surface of the peat changes and becomes anhydrous pectose. The treated and compressed peat, therefore, will dry quickly and will not again absorb any appreciable amount of water. Such a substance forms almost an ideal fuel. The same burns readily and uniformly without any objectionable fumes or smoke. The combustion requires a small amount of air, owing to the chemical composition of the peat and when once ignited, will hold fire for a long time. The calorific value is very high.

The present invention is an improvement upon the method disclosed and claimed in my prior Patent No. 1,334,492, granted March 23rd, 1920. In said patent, a process somewhat similar to the present process was disclosed but at that time it was thought necessary to subject the peat to two mixing and compressing or condensing steps. I have found by further experiment and practice of the process that the desired product can be obtained with only one loosening and mixing step and one compressing step. The present process is, therefore, a great improvement over the process disclosed and claimed in the patent and does actually in two steps what required four steps of treatment in the prior process.

Further objects and advantages of the invention will be fully set forth in the detailed description made in connection with the accompanying drawings which illustrate one form of apparatus which may be used to carry out the process and in which drawings, like reference characters refer to the same parts throughout the different views, and in which, Fig. 1 is a central longitudinal section of an apparatus suitable for carrying out the process of the invention; and Fig. 2 is a vertical section taken on the line 2—2 of Fig 1, as indicated by the arrows.

Peat occurs in large deposits in parts of the United States and Canada, particularly in the northwestern part of the United States. The peat will be dug from the deposit beds and while in its raw condition, will be fed into the feed spout or hopper 1 of the apparatus. The apparatus comprises a casing forming a closed chamber 2 and a partial vacuum of the desired degree will be maintained in this chamber by exhausting the air therefrom through a pipe 3 which may be connected with any suitable air pump or fan. A rotary gate valve 4 is disposed between the hopper 1 and the chamber 2 and this valve is positively rotated by a chain 5 driving a sprocket wheel secured to the shaft of said valve and driven by a sprocket wheel secured to the main feed shaft 6.

The chamber 2 is substantially of rectangular shape at the top and of semi-cylindrical shape at the bottom. The shaft 6 is supported in suitable bearings on the frame member 7 and passes through the chamber 2 substantially at the center of the semi-cylindrical portion. This shaft has secured thereto, a plurality of contacting hubs from which radiate paddles or beater blades 8 equally spaced about the axis thereof, which blades are arranged at an angle to the axis of the shaft and inclined in a direction to progress the material through the chamber 2. At the end opposite the feeding end of the chamber 2, the same is formed with a depressed portion or lower chamber 2ª and the shaft 6, immediately over this chamber, is provided with a plurality of contacting hubs forming a continuation of the previously described series of hubs, which latter hubs have thereon radially extending paddles 9. These paddles are arranged with their flat surfaces parallel to the axis of the shaft 6 and act to press the material downwardly into the chamber 2ª.

Extending from one side of the chamber 2ª is a partly conical and partly cylindrical chamber 10. The conical part of this chamber is formed by a series of rings 11 of different diameters arranged in contacting relation in a supporting cylindrical casing 11ª secured to the end of the casing of chamber 2. The cylindrical part of the casing 10 is formed by a flanged sleeve 12 bolted to said casing 11ª and a sleeve 13 comprising a discharge channel or aperture is suitably secured to the end of the sleeve 12. The rings 11 are provided so that the same may be removed and others substituted to change the degree of taper of the converging or conical channel. Various sizes of discharge sleeves or spouts 13 may also be provided as desired.

A shaft 14 is secured in suitable bearings in the frame and driven by gears attached to the main driving shaft 15 to which is attached the driving pulley 16. The driving gears connecting the shafts 15, 6 and 14, are housed in a gear casing 17 and are thus not shown in the drawing. The bearings in the shaft 14 will, of course, be heavy thrust bearings and this shaft projects through the chamber 2ª and the conical part of chamber 10 and has secured thereto a screw or helical conveyor 18 which is suitably tapered to fit the tapered or conical part of chamber 10.

The raw peat will be fed into hopper 1 and, by turning of the gate valve 4, will be fed into one end of chamber 2. As stated, a partial vacuum is maintained in this chamber and it will be noted that the gate valve 4 acts as a sealing member to prevent the entrance of air into the chamber at the feeding end. In practice, the member 1 is kept well filled with peat from the feeding floor 19 shown at the top thereof, which body of peat will also assist in effectively sealing the chamber 2. The peat dropping onto the paddle members 8, will be thoroughly agitated, beaten and mixed. This action results in breaking up the air or moisture cells and in the presence of the partial vacuum, these broken-up cavities will be closed up and eliminated. The peat, as this action is taking place, is being progressed through chamber 2 and upon reaching the end of the semi-cylindrical portion thereof, the same will be pushed downwardly into chamber 2ª by the paddles 9 and will fall into the convolutions of the screw 18. Here the peat will be advanced into the conical part of chamber 10 and, owing to the tapering form thereof, will be compressed and pushed into the cylindrical part of chamber 10 and then forced therethrough and discharged through the aperture in the discharge sleeve or spout 13. The peat, as it is discharged, is of compact and close formation and any interstices contained therein are very small. Owing to this structure, any moisture remaining in the peat is quickly brought to the surface thereof by capillary action and evaporated at the surface. It is the inability of the water to reach the surface of the peat that prevents efficient drying thereof in its natural or raw state. The peat can be cut or molded into desired blocks to be used as fuel.

As above stated, the pectin of these blocks soon becomes converted to pectose and the peat, when in such condition, will not again absorb any appreciable amount of water.

The peat thus treated, as stated, forms a very desirable fuel. Owing to the large deposits of peat and the small expense necessary to treat the same by the present method, a cheap and desirable fuel can be produced which, at the present time, is certainly a great boon to everybody.

From the above description it is clear that I have produced a process which is a great improvement over anything heretofore known and especially that disclosed in my prior patent. As previously stated, the desired results are achieved in the present process in two steps and with only one compressing step which, in the prior process, required four steps including two compressing steps.

It will, of course, be understood that various changes may be made in the sequence, time and manner of treating the material and that other forms of apparatus may be used without departing from the scope of the present invention which, generally stated, consists in the method illustrated and described and set forth in the appended claims.

What is claimed is:

1. The process of treating raw peat, which consists in agitating and mixing the raw peat in a substantially closed vessel to break up the air and moisture cavities therein, drawing air from said vessel, artificially to dry said peat and then compressing the peat into a compact mass to form the final product.

2. The process of treating peat to produce a dehydrated product which consists in confining the raw peat, agitating and mixing the same in the presence of a partial vacuum, compressing the treated peat into a compact mass and discharging the same.

3. The process of treating peat which consists in feeding the raw peat into a closed chamber producing a partial vacuum therein, agitating and mixing the peat and simultaneously feeding the same through the chamber, compressing the peat and discharging the same in its compressed condition.

4. The process of treating peat which consists in providing a closed chamber, maintaining a partial vacuum therein, feeding the raw peat into the chamber in a manner to prevent the entrance of air into the chamber, agitating and mixing the peat by means of revolving blades, and simultaneously progressing the peat through the chamber by said blades, compressing the peat and at the same time discharging the same in its compressed condition through a comparatively small discharge opening.

In testimony whereof I affix my signature.

HENRY H. HINDSHAW.